(12) United States Patent
Thadisetty et al.

(10) Patent No.: US 11,734,518 B2
(45) Date of Patent: Aug. 22, 2023

(54) ANALYZING MONITORING SYSTEM EVENTS USING NATURAL LANGUAGE PROCESSING (NLP)

(71) Applicant: The ADT Security Corporation, Boca Raton, FL (US)

(72) Inventors: Bhaskar Thadisetty, Boca Raton, FL (US); Patrick Black, Portland, CT (US); Connor McNaboe, Burlington, CT (US); Gary Friar, Sebring, FL (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

(21) Appl. No.: 18/066,761

(22) Filed: Dec. 15, 2022

(65) Prior Publication Data

US 2023/0196025 A1    Jun. 22, 2023

Related U.S. Application Data

(60) Provisional application No. 63/292,245, filed on Dec. 21, 2021.

(51) Int. Cl.
| | |
|---|---|
| *G06F 40/30* | (2020.01) |
| *G10L 25/63* | (2013.01) |
| *G10L 15/18* | (2013.01) |
| *G10L 15/22* | (2006.01) |

(52) U.S. Cl.
CPC .......... *G06F 40/30* (2020.01); *G10L 15/1815* (2013.01); *G10L 15/22* (2013.01); *G10L 25/63* (2013.01)

(58) Field of Classification Search
CPC ..... G10L 15/1815; G10L 15/22; G10L 25/63; G06F 40/30
See application file for complete search history.

(56) References Cited

U.S. PATENT DOCUMENTS

| | | | |
|---|---|---|---|
| 7,487,095 B2 | 2/2009 | Hill et al. | |
| 8,279,779 B2 | 10/2012 | Singh et al. | |
| 9,559,993 B2 | 1/2017 | Palakovich et al. | |
| 10,044,857 B2 | 8/2018 | Philbin | |
| 10,367,652 B2 | 7/2019 | Ehsani et al. | |
| 11,005,678 B2 | 5/2021 | Madden et al. | |
| 11,218,386 B2 | 1/2022 | Kumar et al. | |
| 2005/0175167 A1* | 8/2005 | Yacoub | H04M 3/523 379/265.13 |
| 2010/0211822 A1* | 8/2010 | Colaiacomo | G06F 11/1438 714/E11.13 |

(Continued)

FOREIGN PATENT DOCUMENTS

| | | |
|---|---|---|
| WO | 0209399 A2 | 1/2002 |

*Primary Examiner* — Eric Yen
(74) *Attorney, Agent, or Firm* — Christopher & Weisberg, P.A.

(57) ABSTRACT

A language device is described. A language device includes processing circuitry configured to: determine an urgency level of a message based at least in part on a natural language processing (NLP) model; determine a priority of an event associated with the message based at least in part on the urgency level; and order the message relative to a plurality of other messages in a customer queue based at least in part on the priority of the event associated with the message.

20 Claims, 6 Drawing Sheets

(56) References Cited

U.S. PATENT DOCUMENTS

| | | | |
|---|---|---|---|
| 2013/0191132 A1* | 7/2013 | Tanaka | G01C 21/3608 |
| | | | 704/275 |
| 2013/0262320 A1* | 10/2013 | Makanawala | H04L 51/52 |
| | | | 705/304 |
| 2014/0343937 A1* | 11/2014 | Katis | H04L 51/10 |
| | | | 704/235 |
| 2016/0092792 A1* | 3/2016 | Chandrasekaran | |
| | | | G06F 16/3344 |
| | | | 706/12 |
| 2016/0330156 A1* | 11/2016 | Dunne | H04L 67/02 |
| 2018/0143867 A1* | 5/2018 | Meredith | G06Q 10/10 |
| 2018/0295234 A1* | 10/2018 | Kumar Selvaraj | |
| | | | H04L 65/1059 |
| 2019/0272316 A1* | 9/2019 | Ben Ami | G06F 40/30 |
| 2019/0354875 A1 | 11/2019 | Madden et al. | |
| 2020/0073733 A1* | 3/2020 | Li | G06F 9/448 |
| 2020/0186482 A1* | 6/2020 | Johnson, III | H04L 12/1818 |
| 2020/0356870 A1* | 11/2020 | Ramasamy | G06N 5/025 |
| 2020/0382464 A1* | 12/2020 | Keller | H04W 4/12 |
| 2021/0082426 A1* | 3/2021 | Shuman | G06F 3/167 |
| 2022/0028534 A1* | 1/2022 | Sugiyama | G16H 40/20 |
| 2022/0101220 A1* | 3/2022 | Wicaksono | H04M 3/5233 |
| 2022/0279070 A1* | 9/2022 | DiMaria | H04M 3/5231 |
| 2022/0383265 A1* | 12/2022 | Dhumal | G06F 40/216 |
| 2023/0033852 A1* | 2/2023 | Avrunin | H04N 7/155 |

\* cited by examiner

ANALYZING MONITORING SYSTEM EVENTS USING NATURAL LANGUAGE PROCESSING (NLP)

CROSS-REFERENCE TO RELATED PATENT APPLICATION

This application is related to and claims priority to U.S. Provisional Patent Application Ser. No. 63/292,245, filed Dec. 21, 2021, entitled ANALYZING MONITORING SYSTEM EVENTS USING NATURAL LANGUAGE PROCESSING (NLP), the entirety of which is incorporated herein by reference.

TECHNICAL FIELD

This disclosure relates to methods and systems for analyzing security system events using natural language processing (NLP).

BACKGROUND

Security systems, such as premises security systems, may be designed to protect premises, such as homes, businesses, schools, etc. However, security systems may at times experience issues, e.g., undesired events such as malfunction of components, sensors, controllers, thermostats, etc. Some providers of security systems provide customer service, e.g., for customers to receive help with the security system and/or report events, such as issues that affect the performance of the premises security system and/or the security of the premises. Typical customer service systems provide a customer service phone number for customers to request customer service via a phone call or text message. That is, by calling or sending a text message, the customer may describe by voice or text the reason why customer service is needed. When a customer service agent becomes available, the customer service agent selects the next call or text message in a customer queue, which is typically ordered based on the time in which it was received.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
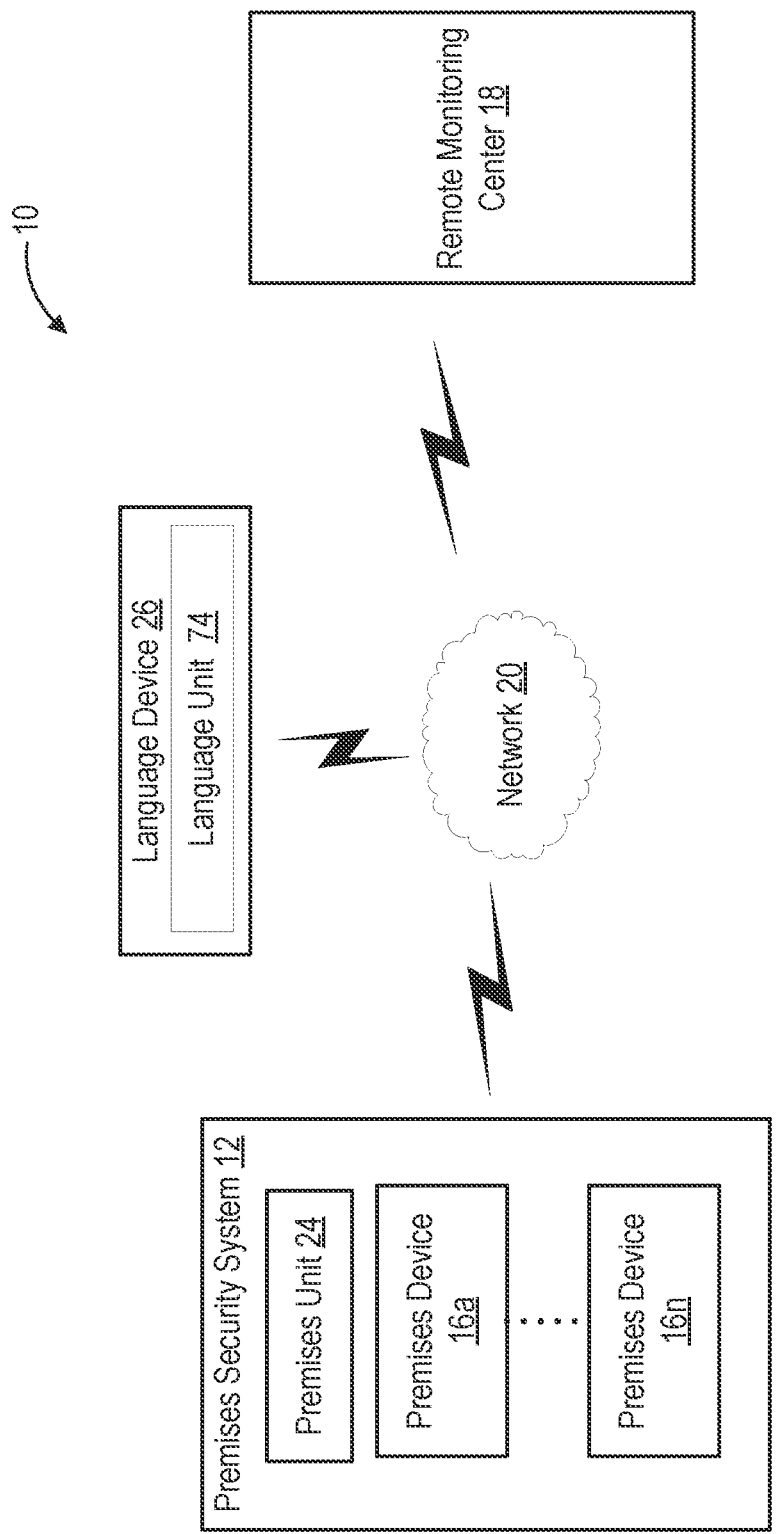
FIG. 1 is a diagram of an example system comprising a premises security system and/or at least a language device according to principles disclosed herein.

Before describing in detail exemplary embodiments, it is noted that the embodiments may reside in combinations of apparatus components and processing steps related to analyzing monitoring system events using natural language processing (NLP). Accordingly, the system and method components may be represented by conventional symbols in the drawings, showing only those specific details that may facilitate understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

Referring to the drawing figures, in which like elements are referred to by like reference numerals, there is shown in FIG. 1 a diagram of an example system 10 comprising a premises security system 12 and/or at least a language device 26, (which as described further herein may be e.g., as part of a cloud service). Premises security system 12 comprises a premises unit 24 and/or premises devices 16a and 16n (collectively referred to as premises device 16). Premises unit 24 may be configured to perform any steps, processes, and/or functions associated with premises security system 12 and/or any other device/component of system 10, e.g., causing the premises security system 12 to receive, relay, and/or transmit a message such as a customer message and/or receive a resolution and/or disposition of an event associated with the message and/or perform at least one action based on the resolution/disposition. Although premises security system 12 is shown as comprising premises devices 16a and 16n, premises security system 12 is not limited to comprising only premises devices 16a and 16n and may include additional premises devices 16. Any premises device 16 can be in simultaneous communication and/or configured to separately communicate with more than one other premises device 16 and/or other premises security system 12 and/or language device 26 and/or remote monitoring center 18 and/or other system 10. Although premises device 16 is included in the premises security system 12, premises device 16 is not limited to being included in the premises security system 12 and/or system 10 and may reside standing alone, as part of another system, or in any other manner. Premises security system 12 may refer to any system, e.g., a security system, an automation system, a security and automation system such as a premises security and automation system, and a device capable of transmitting, relaying, and/or receiving a message such as a customer message. A message may refer to any kind of message including but not limited to a text message, a voice message, data/information associated with any component of system 10 such as premises security system 12, premises devices 16, language device 26, remote monitoring center 18, or a combination thereof. A message may also refer to a message that includes at least one word, symbol, character, etc., and may refer to and/or include language such as language used by humans to communicate or any other kind of language. The message may include information associated with an event, such as an event related to a premises security system 12 and/or be intended to reach an agent such as a customer service agent, e.g., for the customer service agent to resolve the event and/or take an action (or cause an action to be performed).

Further, each premises device 16 may include one or more of sensors, detector, Internet of Things (IoT) device, control panels, control devices, images capture devices, life safety devices, lifestyle devices and other devices. For example, the types of sensors may include various life safety related sensors, such as motion sensors, fire sensors, carbon monoxide sensors, flooding sensors and contact sensors, among other sensor types. The control devices may include, for example, one or more lifestyle (e.g., premises automation) related devices configured to adjust at least one premises setting, such as lighting, temperature, energy usage, door lock and power settings, among other settings associated with the premises or devices on the premises. Image capture devices may include digital cameras and/or video cameras, among other image capture devices. In one or more embodiments, premises device 16 may be a wireless device, such as a cell phone, tablet, mobile device, etc., that is configured to communicate with one or more entities in system 10. In one or more embodiments, the wireless device (not shown) may be configured to communicate with one or more of premises security system 12, language device 26, remote monitoring center 18, etc. In some embodiments, premises device 16 may be a device that communicates with one or more entities in system 10 via a wired connection, e.g., a wired IEEE 802.3 Ethernet network.

System 10 may also include a remote monitoring center 18, which may be capable of performing certain monitoring, configuration and/or control functions associated with system 10. Remote monitoring center 18 may be configured to enable an agent (e.g., a customer service agent) to monitor data. For example, with respect to fire and carbon monoxide detectors/sensors, the monitored data may include carbon monoxide readings, smoke detection readings, sensor location and time of readings, among other related to these detectors that may be communicated with remote monitoring center 18. In yet another example, with respect to a door contact detector, the monitored data may include sensor location and time of detection, among other data related to the door contact detection that may be communicated with remote monitoring center 18. In one other example, monitored data may be data corresponding to an event associated with a message received by any component of system 10, such as a message requesting customer service.

Premises system data, e.g., alarm event data and/or any data associated with the premises devices 16, may be used by the remote monitoring center 18 for performing various safety response processes, e.g., notifying the owner of the premises, determining whether an actual alarm event is occurring at the premises, and notifying any appropriate response agency and/or first responder (e.g., police, fire, emergency response, other interested parties such as premises owners, etc.).

Further, system 10 may include language device 26 which may refer to any device configurable for direct/indirect communication with premises security system 12 and/or remote monitoring center 18 and/or any other component of system 10. Language device 26 may include at least a language unit 74. Language unit 74 may be configured at least to perform any step/process/feature described in the present disclosure, e.g., NLP of at least one message associated with system 10 and/or determine an NLP mode and/or determine an urgency level of a message based at least in part on an NLP model and/or determine a priority of an event associated with the message. As used herein, NLP model(s) may refer to one or more processing models (e.g., processing machine learning models) that are configured (e.g., trained) to analyze language data such as to interpret the contents of the language data including contextual nuances within the language data, where such analysis may then be used to perform one or more functions such as classifying or prioritizing a customer message or call. Although language device 26 is shown as a standalone device, language device 26 is not limited to being standalone and may be part of any component of system 10, e.g., premises unit 24 and/or premises security system 12 and/or remote monitoring center 18. For example, language device 26 may be part of remote monitoring center 18 such that an agent at remote monitoring center 18 may interact with language device 26 via a user interface. In another example, language device 26 may be part of premises security system 12 such that a user (e.g., premises occupant) is able to interact with language device 26 via user interface 88, e.g., to transmit a message to any component of system 10.

In one other example, language device 26 may be provided through a network of remote distributed computing resources (e.g., as part of a cloud service) and/or via one or more remote servers, i.e., functions and/or services and/or features and/or task associated with and/or performed by the language device are provided by one or more remote servers. One or more remote servers may reside in any component of system 10, such as remote monitoring center 18, or reside outside of system 10 such as part of a service provided by a third party. In another example, one or more components of premises system 12 may be implemented through a network of remote distributed computing resources, such that premises unit 24 is implemented in a cloud network. In a more specific example, at least one premises device 16 may be implemented in a remote distributed computing network and/or communicate with any other component of system 10 via network 20 (e.g., premises device 16 may be a sensor installed at a remote location and configured to communicate with other components of system 10 via wireless/wired communication). Hence, in one or more embodiments, the functions performed by language unit 74 and/or language device 26 and/or premises unit 24 may be provided as one or more cloud services. Further, premises security system 12 and/or remote monitoring center 18 may be configured to have the same or similar components, e.g., hardware and/or software, as those described for language device 26.

Further, system 10 may include network 20 (which may refer to a plurality of networks), which may be configured to provide direct/indirect communication, e.g., wired and/or wireless communication, between any two or more components of system 10, e.g., premises security system 12, premises device 16, premises unit 24, remote monitoring center 18, language device 26. In a non-limiting example, premises device 16 of premises security system 12 may communicate with the remote monitoring center 18 and/or language device 26 via network 20, e.g., to transmit a message such as a customer message related to premises security system 12. Although network 20 is shown as an intermediate network between components/devices of system 10, any component/device may communicate directly with any other component/device of system 10. In a non-limiting example, language device 26 may communicate directly with premises security system 12, premises unit 24, premises device 16, and/or remote monitoring center 18. Further, network 20 (and/or a partition of network 20 such as virtual network) may refer to a cloud network and/or a cloud network component and/or provide services associated with a cloud network.

Note further that functions described herein as being performed by a language device 26 may be distributed over a plurality of language devices 26 (which may be deployed, e.g., as part of a cloud service or cloud services). In other words, the functions of the language device 26 described herein are not limited to performance by a single physical device and, in fact, can be distributed among several physical devices. Similarly, functions described herein as being performed by a premises security system 12 and remote monitoring center 18 may be distributed over a plurality of premises security systems 12 and a plurality of remote monitoring centers 18, respectively.

Figure 2:
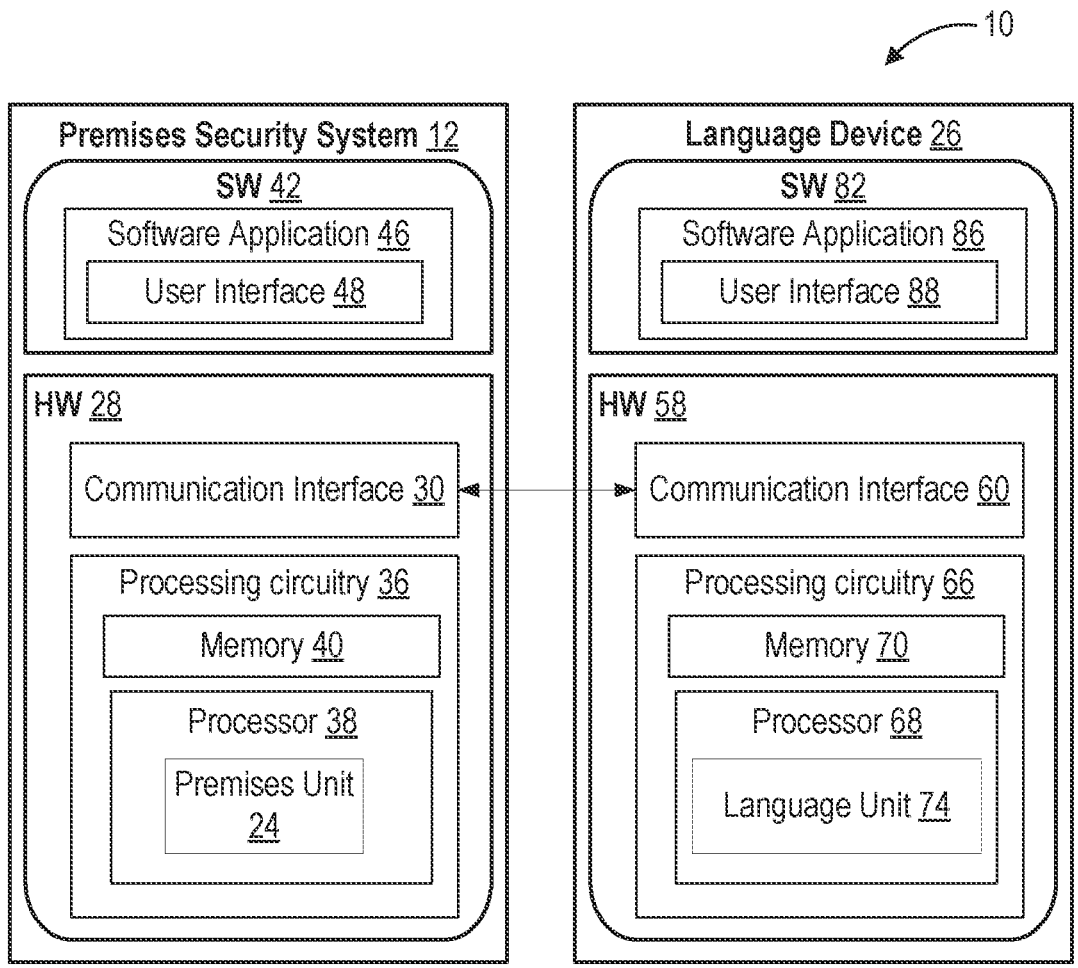
FIG. 2 is a block diagram of some devices in the system according to some embodiments of the present disclosure.

Example implementations, in accordance with an embodiment of system 10 discussed in the preceding paragraphs will now be described with reference to FIG. 2.

The system 10 includes a premises security system 12 including hardware 28. The hardware 28 may include processing circuitry 36. The processing circuitry 36 may include a processor 38 and a memory 40. In particular, in addition to or instead of a processor, such as a central processing unit, and memory, the processing circuitry 36 may comprise integrated circuitry for processing and/or control, e.g., one or more processors and/or processor cores and/or field programmable gate arrays (FPGAs) and/or application specific integrated circuits (ASICs) adapted to execute instructions. The processor 38 may be configured to access (e.g., write to and/or read from) the memory 40, which may comprise any kind of volatile and/or nonvolatile memory, e.g., cache and/or buffer memory and/or random access memory (RAM) and/or read-only memory (ROM) and/or optical memory and/or erasable programmable read-only memory (EPROM). Further, memory 40 may be configured as a storage device.

Hardware 28 of premises security system 12 may include communication interface 30 enabling it to communicate directly/indirectly with any component/device of system 10. For example, communication interface 30 may be configured for setting up and maintaining at least a wireless/wired connection with any component/device of system 10 such as language device 26. The communication interface 30 may be formed as or may include, for example, one or more radio frequency (RF) transmitters, one or more RF receivers, and/or one or more RF transceivers.

Premises security system 12 further has software 42 (which may include software application 46 and/or user interface 48) stored internally in, for example, memory 40, or stored in external memory (e.g., database, storage array, network storage device, etc.) accessible by the premises security system 12 via an external connection. Software application 46 may include any software/program configured to perform the steps/processes of the present disclosure, e.g., providing an interface for a user (e.g., user interface 48) to provide an input (e.g., a message) to the premises security system 12 and/or receive an output (e.g., a message such as a resolution to an event) from the premises security system 12. Further, software application 46 may run and/or be included directly as part of software 42 and/or premises security system 12. Software application 46 may be virtualized and/or running outside premises security system 12 and/or any of the components of premises security system 12.

The processing circuitry 36 may be configured to control any of methods and/or processes described herein and/or to cause such methods, and/or processes to be performed, e.g., by premises security system 12. Processor 38 corresponds to one or more processors 38 for performing premises security system 12 functions described herein. The memory 40 is configured to store data and/or files such as premises system data and/or other information/data described herein. In some embodiments, the software 42 may include instructions that, when executed by the processor 38 and/or processing circuitry 36, causes the processor 38 and/or processing circuitry 36 to perform the processes described herein with respect to premises security system 12. For example, processing circuitry 36 of the premises security system 12 may include premises unit 24 which may be configured to perform to perform any steps/process/functions associated with premises security system 12 and/or any other device/component of system 10, e.g., causing the premises security system 12 to receive/relay/transmit a message such as a customer message and/or receive a resolution/disposition of an event associated with the message and/or perform at least one action based on the resolution/disposition.

The system 10 further includes language device 26 including hardware 58. Hardware 58 of language device 26 may include communication interface 60 enabling language device 26 to communicate directly/indirectly with any component/device of system 10. For example, communication interface 60 may be configured for setting up and maintaining at least a wireless/wired connection with any component/device of system 10 such as premises security system 12 and/or remote monitoring center 18. The communication interface 60 may be formed as or may include, for example, one or more RF transmitters, one or more RF receivers, and/or one or more RF transceivers. The functionalities of the language device 26 described herein may also be implemented, e.g., as part of a cloud service.

The hardware 58 may include processing circuitry 66. The processing circuitry 66 may include a processor 68 and a memory 70. In particular, in addition to or instead of a processor, such as a central processing unit, and memory, the processing circuitry 66 may comprise integrated circuitry for processing and/or control, e.g., one or more processors and/or processor cores and/or FPGAs and/or ASICs adapted to execute instructions. The processor 68 may be configured to access (e.g., write to and/or read from) the memory 70, which may comprise any kind of volatile and/or nonvolatile memory, e.g., cache and/or buffer memory, RAM, ROM, optical memory, and/or EPROM. Further, memory 70 may be configured as a storage device.

Language device 26 may further include software 82 (which may include software application 86 and/or user interface 88) stored internally in, for example, memory 70, or stored in external memory (e.g., database, storage array, network storage device, etc.) accessible by the language device 26 via an external connection. Software application 86 may include any software/program configured to perform the steps/processes of the present disclosure, e.g., providing an interface for a user (e.g., a customer, an agent) to provide an input to the language device 26 and/or receive an output from the language device 26. Further, software application 86 may run and/or be included directly as part of software 82 and/or language device 26. Software application 86 may be virtualized and/or running outside language device 26 and/or any of the components of language device 26. Further, the functions of language device 26 may be implemented as firmware.

The processing circuitry 66 may be configured to control any of methods and/or processes described herein and/or to cause such methods, and/or processes to be performed, e.g., by language device 26. Processor 68 corresponds to one or more processors 68 for performing language device 26 functions described herein. The memory 70 is configured to store data and/or files, e.g., messages/data/information generated by language unit 74 and/or user interface 88 and/or other information described herein. In some embodiments, the software 72 may include instructions that, when executed by the processor 68 and/or processing circuitry 66, causes the processor 68 and/or processing circuitry 66 to perform the processes described herein with respect to language device 26. For example, processing circuitry 66 of the language device 26 may include language unit 74. Language unit 74 may be configured to perform any step/process/features described in the present disclosure, e.g., performing NLP of at least one message associated with system 10 and/or determining an NLP mode and/or determine an urgency level of a message based at least in part on an NLP model and/or determine a priority of an event associated with the message.

Figure 3:
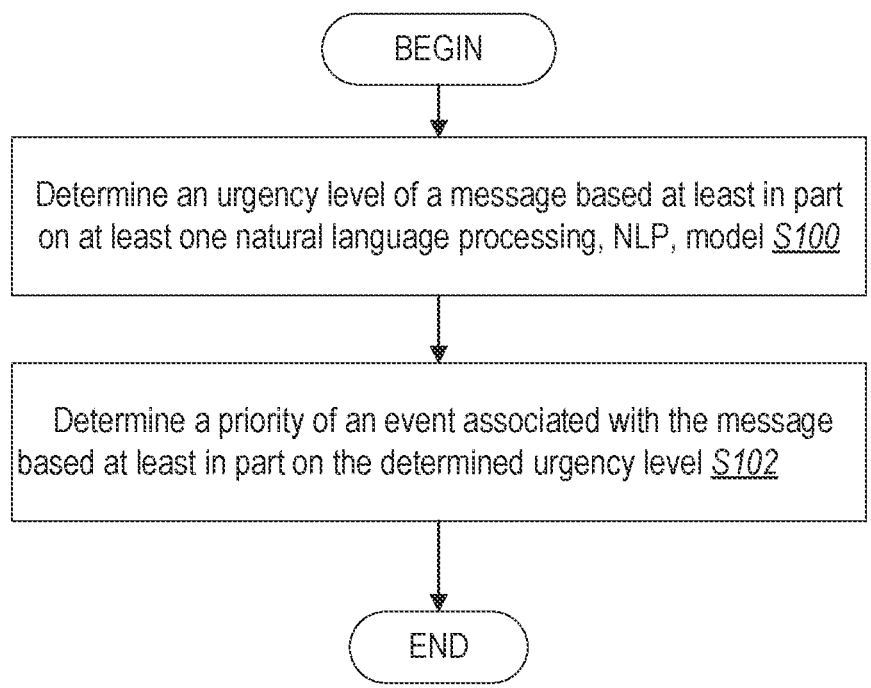
FIG. 3 is a flowchart of an example process in a language device according to some embodiments of the present disclosure.

FIG. 3 is a flowchart of an example process in language device 26 according to some embodiments of the present disclosure. One or more blocks described herein may be performed by one or more elements of language device 26 such as by one or more of processing circuitry 66 (including the language unit 74) and/or processor 68 and/or communication interface 60. Language device 26 is configured to determine (Block S100) an urgency level of a message based at least in part on at least one NLP model; and determine (Block S102) a priority of an event associated with the message based at least in part on the determined urgency level.

In some embodiments, the plurality of NLP models is determined, such as via processing circuitry 66, where a plurality of NLP models includes the at least one NLP model corresponding to a language pattern associated with the message.

In some other embodiments, the processing circuitry 66 is further configured to determine a resolution type based at least on message; and retrain and improve the at least one NLP model of the plurality of NLP models based on the determined resolution type.

In an embodiment, the processing circuitry 66 is further configured to determine an NLP model update based on an event disposition.

In another embodiment, the processing circuitry 66 is further configured to determine an alert to be transmitted to at least a first responder based on the at least one NLP model.

In some embodiments, the processing circuitry 66 is further configured to determine a plurality of messages associated with the message; perform an NLP of the plurality of messages to determine any one of a performance level of an agent associated with at least one message of the plurality of messages and an effectiveness level of an event disposition.

In some other embodiments, the performed NLP includes voice-to-text NLP.

In an embodiment, the processing circuitry 66 is further configured to perform NLP of a voice associated with at least a voice call to prioritize at least one description of a dangerous event, i.e., a predefined event type.

In another embodiment, performing NLP of the voice further includes determining at least an emotion of a person associated with the voice.

In some embodiments, the communication interface 60 is further configured to receive the message, the message including information about the event; and transmit the message to at least one agent.

Figure 4:
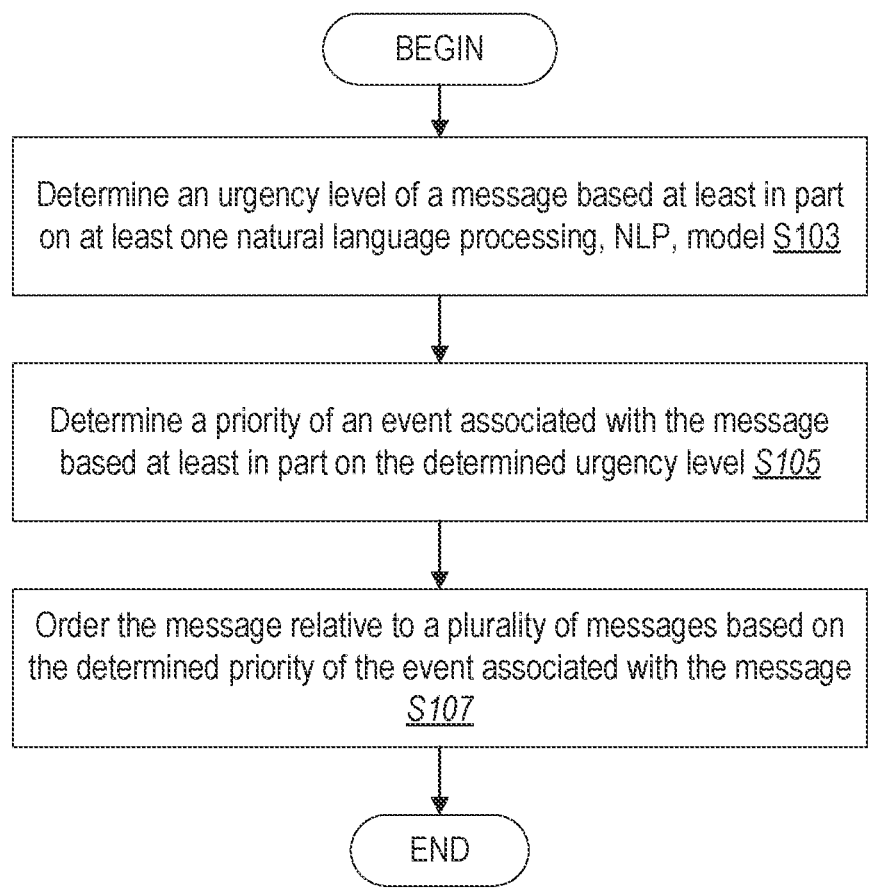
FIG. 4 is a flowchart of another example process in a language device according to some embodiments of the present disclosure.

FIG. 4 is a flowchart of an example process in language device 26 according to some embodiments of the present disclosure. One or more blocks described herein may be performed by one or more elements of language device 26 such as by one or more of processing circuitry 66 (including the language unit 74) and/or processor 68 and/or communication interface 60. Language device 26 is configured to determine an urgency level of a message based at least in part on a natural language processing (NLP) model (Block S103); determine a priority of an event associated with the message based at least in part on the urgency level (Block S105); and order the message relative to a plurality of other messages in a customer queue based at least in part on the priority of the event associated with the message (Block S107).

In at least one embodiment, the method comprises determining a plurality of NLP models, the at least one NLP model being among the plurality of NLP models corresponding to a language pattern associated with the message.

In at least one embodiment, the method comprises determining a resolution type based at least in part on the message; and retraining the NLP model based at least in part on the resolution type.

In at least one embodiment, the method comprises determining an NLP model update based on an event disposition.

In at least one embodiment, the method comprises determining an alert to be transmitted to a first responder based at least in part on the NLP model.

In at least one embodiment, the method comprises determining a plurality of messages associated with the message; and inputting the plurality of messages to another NLP model to determine a performance level of an agent associated with at least one of the plurality of messages.

In at least one embodiment, the method comprises determining a plurality of messages associated with the message; and inputting the plurality of messages to another NLP model to determine an effectiveness level of an event disposition.

In at least one embodiment, the method comprises inputting voice data associated with a voice call to another NLP model to prioritize the voice call.

In at least one embodiment, the other NLP model is configured to detect an emotion of a person associated with the voice data.

In at least one embodiment, the language device further comprises a communication interface in communication with the processing circuitry, the communication interface being configured to: receive the message, the message including information about the event; and transmit the message to at least one agent device.

Having described the general process flow of arrangements of the disclosure and having provided examples of hardware and software arrangements for implementing the processes and functions of the invention, the sections below provide details and examples of arrangements for performing/determining NLP, e.g., in security monitoring applications such as to improve responsiveness and effectiveness of incident/monitoring alert responses.

In some embodiments, NLP may be used to determine an urgency of message (e.g., an emergency text from a client) and/or determine (e.g., adjust) a priority of an event (e.g., an incident) based on at least one NLP model. Determining the urgency and or the priority of the event may be referred to a prioritization process.

In some other embodiments, NLP of at least one message (e.g., text messages) may be used, e.g., to route an event (e.g., incident) to at least one agent (e.g., to specific agents such as customer service agents). Using NLP as such may refer to a classification process. The classification process may also include ordering messages in a customer queue for response by the at least one agent at remote monitoring center 18 based on NLP of each message.

In an embodiment, a resolution and/or resolution type may be determined. At least the resolution type and/or messages (e.g., texts sent) may be used to retrain and improve NLP models such as for future incident determination. Using the resolution type and message as such may refer to a manual model update.

In another embodiment, real-time NLP model update may be determined (e.g., provided) based on a disposition (e.g., last incident disposition).

In some embodiments, NLP of at least a message (e.g., text messages) may be used to automatically address an event/incident (e.g., auto close an event/incident).

In some other embodiments, automatically alerting and routing information to first-responders (police, fire, medical, etc.) is performed based on NLP of at least one message (e.g., text messages). For example, NLP of a message indicates the message is associated with a predefined urgent event that requires first-responders such that language device 26 causes transmission of an alert message and/or routing information to first-responders to respond to the urgent event.

In an embodiment, NLP processing of a plurality of messages (e.g., completed text conversations) may be performed, e.g., to assess performance of agent, effectiveness of incident disposition. NLP processing of the plurality of message may be used for and/or refer to scoring agent performance such as for training purposes.

In another embodiment, voice-to-text NLP processing of at least one message (e.g., completed incident conversations) may be performed such as to determine agent efficiency.

In some embodiments, a voice call (e.g., an inbound voice call) may be received and/or NLP processing of a voice (e.g., of a person speaking on the voice call) may be performed, e.g., while the client/customer is waiting for an agent such as to prioritize descriptions of dangerous events (e.g., situations).

In some other embodiments, determine emotion, e.g., from a voice of a person, associated with a voice call. The determined emotion may be used to prioritize an event/message.

Figure 5:
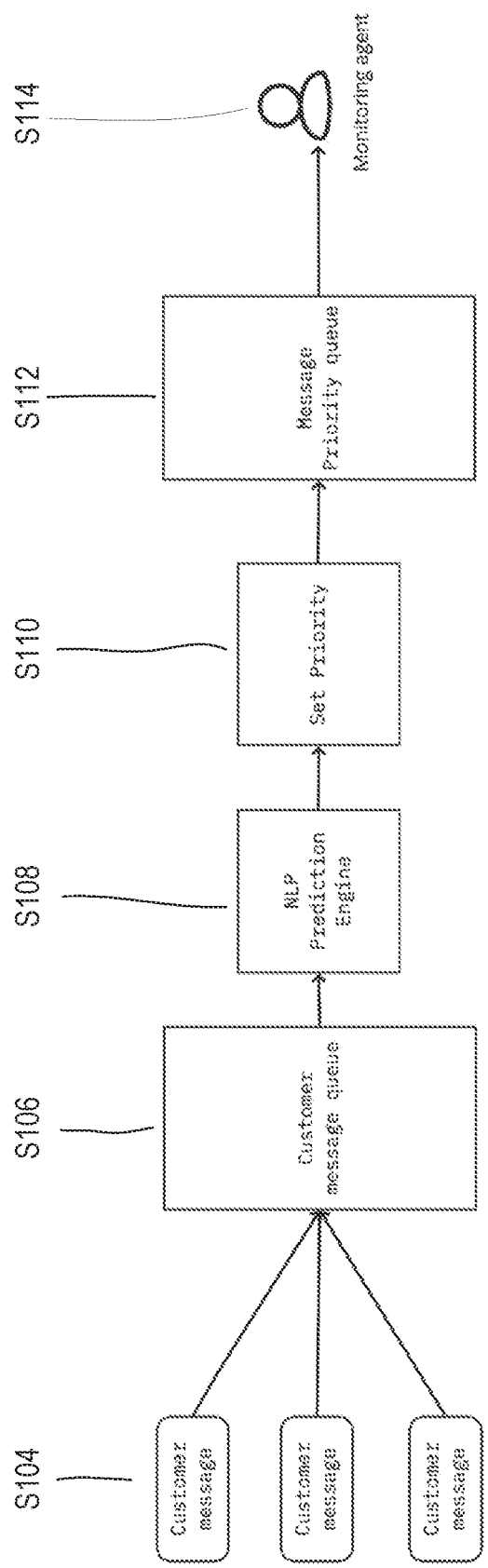
FIG. 5 shows an example process according to some embodiments of the present disclosure.

FIG. 5 shows an example process according to some embodiments of the present disclosure. At step S104, a message (or more than one message) is received, e.g., via communication interface 60 of language device 26. The message may be a customer message and/or transmitted by a customer associated with any component system 10 and/or relayed by any component of system 10 such as premises security system 12 and/or remote monitoring center 18 and/or received by language device 26. At step 106, a message queue, e.g., a customer message queue may be determined, e.g., via processing circuitry 66, to order/arrange the message in a predetermined order such as a first-in first-out sequence. The message queue may include one or more messages, including messages from more than one source, e.g., customer. At step S108, at least one NLP model such as a prediction engine (an NLP prediction engine) may be determined, e.g., via processing circuitry 66, to perform any prediction task such as to determine NLP models, perform one or more a text/voice predictions, predict relation among the contents of a message, etc. At step S110, a priority, e.g., of a message and/or contents of the message, is determined. At step S112, a priority queue is determined and/or transmitted. For example, the priority queue may include messages of the customer message queue but re-ordered based on the priority of each message such that the higher priority messages are queued to be acted on before the lower priority message(s). At step S114, an agent (e.g., a customer service agent, a monitoring agent, etc.) or remote monitoring center 18 receives the priority queue. The agent may then take (and/or cause an action to be performed based on the received priority queue. Alternatively at step S114, monitoring agent may receive the highest priority message from the message priority queue such that more urgent messages are acted on before less urgent messages.

For example, a first customer that transmits a message including the words "sensor accuracy has decreased" to an agent, e.g., via premises device 16, may be given a lower priority (and/or lower urgency level) by language device 26 than a second customer that transmits a message including the words "Fire in the kitchen." That is, language device 26 uses one or more NLP models to determine to prioritize the message of the second customer over the message of the first customer. In another example, a message is received, e.g., by monitoring agent via language device 26 and/or remote monitoring center 18, where the message includes the words "fire sensor in the kitchen is off." Although the message includes the words "fire" and "in the kitchen," language device 26 may determine a priority (and/or urgency level) that is lower than a determined priority (and/or urgency level) of the message that only includes the words "fire in the kitchen." That is, messages may be prioritized and/or classified based the contents of the message, e.g., words, characters, context, symbols, and/or any other information. The priority (and/or urgency level) may be determined based on NLP and NLP models which may contain patterns of words, characters, symbols, and/or voice information such as voice intonation, inflection, volume levels, frequency, noise, etc.

Figure 6:
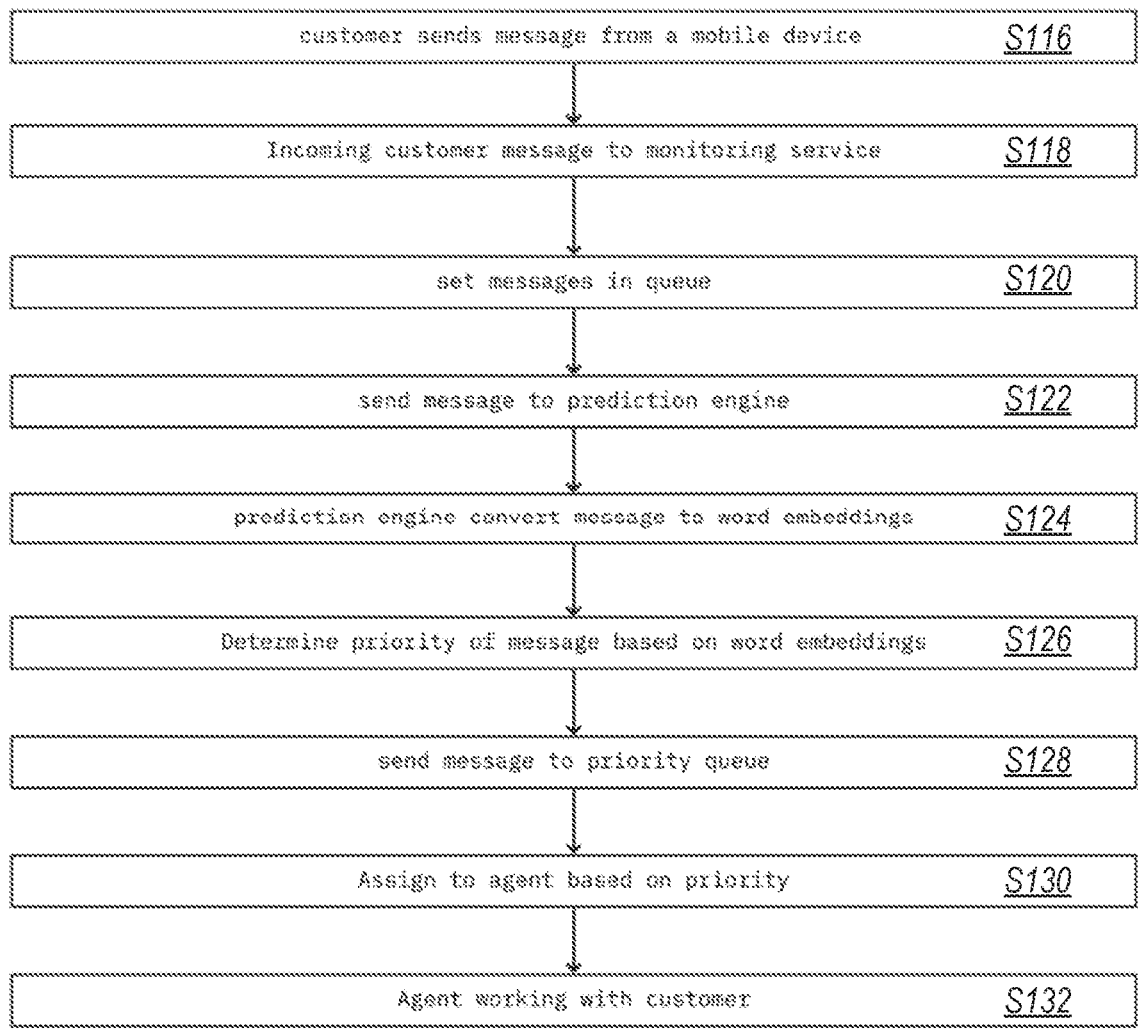
FIG. 6 shows another example process according to some embodiments of the present disclosure.

FIG. 6 shows another example process according to some embodiments of the present disclosure. At step S116, a message is transmitted, e.g., a customer of system 10 sends a message from a device such as a device that is part of or associated with premises security system 12. The device may be mobile. At step S118, the message is determined to be incoming, e.g., received by any component of system 10 such as language device 26 and/or remote monitoring center 18. The message may be received by one or more security monitoring services s. Security monitoring services may be provided by any component of system 10 such as remote monitoring center 18. At step S120, received messages are set in a queue, e.g., based on a predetermined order rule such as first-in first-out. At step S122, at least one of the messages in the queue is transmitted to a prediction engine, such as a prediction engine implemented by processing circuitry 66. At step S124, the prediction engine converts the message to one or more word embeddings. Word embedding (e.g., converting the message to one or more word embeddings) may include determining a representation (e.g., a same representation) for words that at least are similar and/or have similar meaning. In a nonlimiting example, semantically similar words may be mapped together. Same context words (e.g., words associated with and/or corresponding to a context) may be mapped to a vector space (e.g., close vector space). In another nonlimiting example, words such as "emergency" and "help" may have similar vectors to other words such as the word "ambulance" whereas the word "table" may have another vector, e.g., a distant vector. An input word may be used to estimate a probability (e.g., a close probability) of another word being in a neural network.

At step S126, a priority of the message is determined based at least on the word embeddings. At step S128, the message is transmitted to a priority queue where the message is ordered in the priority queue according to the priority determined in step S126. At step S130, based on the determined priority, the message may be assigned to one or more agents, e.g., from a plurality of agents. For example, agents that are trained to resolve issues with fires may be assigned when the message includes the words "fire in the kitchen," while agents that are specialized on sensors may be assigned when the message includes the words "fire sensor in the kitchen is off." That is, in one example, language device 26 may queue the message for response by a specially trained agent even though another agent may be available to response to the message. In another example, messages with a higher priority are assigned to first available agents such that higher priority messages are acted on before lower priority messages. At step S132, an agent, such as an agent assigned at step S130, may begin or resume working with the customer that sent the message.

In one or more embodiments, based on the determined priority of a message, the language device 26 and/or remote monitoring center 18 may cause or trigger at least one action at the premises and/or premises security system 12 where the at least one action may occur before step S132 is performed. For example, the language device 26 may trigger one or more diagnostic routines for one or more premises devices 16 based at least on the processing of the message by at least one NLP model. In this example, the message may include "fire sensor in the kitchen is off" or an indication that a sensor is not working. In another example, language device 26 may trigger one or more premises devices 16 and/or premises automation devices based at least on the processing of the message by at least one NLP model. For example, for the "fire in the kitchen" message, the language device 26 may trigger at least one of: one or more lighting fixtures to turn on or flash (to show a path towards an exit), one or more doors to unlock, a garage door to open, etc.

In yet another example, any component of system 10 may be associated with a vehicle. Further, a person associated with the vehicle (e.g., a driver, an occupant, vehicle owner, vehicle user, etc.) sends a message to report an event such as a driver of a ride-sharing vehicle sending a message including the words "someone is attacking me with a gun." A priority of the message may be determined, e.g., step S126, to be high or greater than other messages in the queue, and the message assigned to an agent based on the determined priority (e.g., steps S128 and/or S130).

In some embodiments, the language device 26 may cause the above action(s) by sending a message to premises unit 24 and/or to premises devices 16.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A language device comprising:
processing circuitry configured to:
   determine an urgency level of a message based at least in part on a natural language processing (NLP) model;
   determine a priority of an event associated with the message based at least in part on the urgency level; and
   order the message relative to a plurality of other messages in a customer queue based at least in part on the priority of the event associated with the message.

2. The language device of claim 1, wherein the processing circuitry is further configured to:
   determine a plurality of NLP models, the NLP model being among the plurality of NLP models and corresponding to a language pattern associated with the message.

3. The language device of claim 1, wherein the processing circuitry is further configured to:
   determine a resolution type based at least in part on the message; and
   retrain the NLP model based at least in part on the resolution type.

4. The language device of claim 3, wherein the processing circuitry is further configured to:
   determine an NLP model update based on an event disposition.

5. The language device of claim 1, wherein the processing circuitry is further configured to:
   determine an alert to be transmitted to a first responder based at least in part on the NLP model.

6. The language device of claim 1, wherein the processing circuitry is further configured to:
   determine a plurality of messages associated with the message; and
   input the plurality of messages to another NLP model to determine a performance level of an agent associated with at least one of the plurality of messages.

7. The language device of claim 1, wherein the processing circuitry is further configured to:
   determine a plurality of messages associated with the message; and
   input the plurality of messages to another NLP model to determine an effectiveness level of an event disposition.

8. The language device of claim 1, wherein the processing circuitry is further configured to:
   input voice data associated with a voice call to another NLP model to prioritize the voice call.

9. The language device of claim 8, wherein the other NLP model is configured to detect an emotion of a person associated with the voice data.

10. The language device of claim 1, wherein the language device further comprises a communication interface in communication with the processing circuitry, the communication interface being configured to:
    receive the message, the message including information about the event; and
    transmit the message to at least one agent device.

11. A method performed by a language device, the method comprising:
    determining an urgency level of a message based at least in part on a natural language processing (NLP) model;
    determining a priority of an event associated with the message based at least in part on the urgency level; and
    ordering the message relative to a plurality of other messages in a customer queue based at least in part on the priority of the event associated with the message.

12. The method of claim 11, further comprising:
    determining a plurality of NLP models, the NLP model being among the plurality of NLP models and corresponding to a language pattern associated with the message.

13. The method of claim 11, further comprising:
    determining a resolution type based at least in part on the message; and
    retraining the NLP model based at least in part on the resolution type.

14. The method of claim 13, further comprising:
    determining an NLP model update based on an event disposition.

15. The method of claim 11, further comprising:
    determining an alert to be transmitted to a first responder based at least in part on the NLP model.

16. The method of claim 11, further comprising:
    determining a plurality of messages associated with the message; and
    inputting the plurality of messages to another NLP model to determine a performance level of an agent associated with at least one of the plurality of messages.

17. The method of claim 11, further comprising:
    determining a plurality of messages associated with the message; and
    inputting the plurality of messages to another NLP model to determine an effectiveness level of an event disposition.

18. The method of claim 11, further comprising:
inputting voice data associated with a voice call to another NLP model to prioritize the voice call.

19. The method of claim 18, wherein the other NLP model is configured to detect an emotion of a person associated with the voice data.

20. The method of claim 11, further comprising:
receiving the message, the message including information about the event; and
transmitting the message to at least one agent device.

* * * * *